United States Patent
Haesemann

(10) Patent No.: US 9,739,189 B2
(45) Date of Patent: Aug. 22, 2017

(54) METERING VALVE FOR ADDITIVES AT RISK OF FREEZING

(71) Applicant: EMITEC GESELLSCHAFT FÜR EMISSIONSTECHNOLOGIE MBH, Lohmar (DE)

(72) Inventor: Gottfried Wilhelm Haesemann, Kuerten-Bechen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/766,358

(22) PCT Filed: Jan. 9, 2014

(86) PCT No.: PCT/EP2014/050255
§ 371 (c)(1),
(2) Date: Aug. 6, 2015

(87) PCT Pub. No.: WO2014/121966
PCT Pub. Date: Aug. 14, 2014

(65) Prior Publication Data
US 2015/0377105 A1    Dec. 31, 2015

(30) Foreign Application Priority Data
Feb. 8, 2013   (DE) .................. 10 2013 101 282

(51) Int. Cl.
*F16K 1/32*    (2006.01)
*F01N 3/20*    (2006.01)
(Continued)

(52) U.S. Cl.
CPC .............. *F01N 3/208* (2013.01); *F16K 1/32* (2013.01); *F01N 2610/02* (2013.01);
(Continued)

(58) Field of Classification Search
CPC ...... F02M 61/168; F02M 61/02; Y02T 10/24; F01N 3/208; F16K 1/32
(Continued)

(56) References Cited

U.S. PATENT DOCUMENTS 2,908,288 A * 10/1959 Carr ...................... F16K 17/06
137/524
6,834,667 B2  12/2004 Sumiya et al.
(Continued)

FOREIGN PATENT DOCUMENTS

DE    10 2010 002 335    8/2011
EP         1 467 086    10/2004
(Continued)

OTHER PUBLICATIONS

Office Action dated Dec. 30, 2016 which issued in the corresponding Chinese Patent Application No. 201480007721.3.

*Primary Examiner* — Craig Schneider
*Assistant Examiner* — P. Macade Nichols
(74) *Attorney, Agent, or Firm* — Cozen O'Connor

(57) ABSTRACT

A metering valve having a valve housing, a channel, a valve body that can be moved in order to open and close the metering valve, and a spring, which applies a spring force to the valve body and thus keeps the valve body in a rest position. The spring is supported on at least one calibration body. The valve body, the spring, and the at least one calibration body are arranged in the channel, and the at least one calibration body is supported by a supporting component fastened in the valve housing by a material-bonding connection. A segment of the supporting component protrudes from the valve housing.

7 Claims, 2 Drawing Sheets

(51) Int. Cl.
*F02M 61/02* (2006.01)
*F02M 61/16* (2006.01)

(52) U.S. Cl.
CPC ...... *F01N 2610/1453* (2013.01); *F02M 61/02* (2013.01); *F02M 61/168* (2013.01); *Y02T 10/24* (2013.01)

(58) Field of Classification Search
USPC .......................................................... 137/540
See application file for complete search history.

(56) References Cited

U.S. PATENT DOCUMENTS 6,910,494 B2 *  6/2005  Warsakis ................ F16B 4/004
                                                137/15.18
2004/0183047 A1   9/2004  Warsakis

FOREIGN PATENT DOCUMENTS

JP   2002-161826    6/2002
WO   WO 2013/113881 8/2013

\* cited by examiner

METERING VALVE FOR ADDITIVES AT RISK OF FREEZING

CROSS REFERENCE TO RELATED APPLICATIONS

This is a U.S. national stage of application No. PCT/EP2014/050255, filed on Jan. 9, 2014. Priority is claimed on German Application No. DE 102013101282.5, filed Feb. 8, 2013, the content of which is incorporated here by reference.

BACKGROUND OF THE INVENTION

1. Field of the Invention

The invention relates to a dosing valve that may be used for dosing a liquid from a pressurized accumulator.

2. Detailed Description of Prior Art

The dosing valve is suitable in particular for dosing a liquid additive that is at risk of freezing. Such a liquid additive that is at risk of freezing is for example a urea-water solution. A urea-water solution is generally used for exhaust-gas purification in exhaust-gas treatment devices in the automotive field. In recent times, in exhaust-gas treatment devices for the purification of the exhaust gases of internal combustion engines in motor vehicles, increasing use has been made of the SCR [Selective Catalytic Reduction] method. In said method, nitrogen oxide compounds in the exhaust gas are reduced to form non-hazardous substances. For this purpose, urea-water solution as reducing agent precursor, or ammonia as reducing agent, is fed to the exhaust-gas treatment device. The urea-water solution is converted to form ammonia thermolytically (by high temperatures) and/or hydrolytically (with assistance from a catalytic converter). The nitrogen oxide compounds in the exhaust gas react with the ammonia to form non-hazardous substances (in particular to form $CO_2$, water and nitrogen). The additive is for example urea-water solution.

For exhaust-gas purification, widespread use is made of a 32.5% urea-water solution that is available under the trade name AdBlue®. Said urea-water solution freezes at −11° C. In the automotive field, such low temperatures can arise in particular during long standstill phases.

An SCR dosing system may be designed such that, even during said standstill phases, liquid additive is present in a dosing valve provided for dosing the liquid additive. The SCR dosing system is thus not evacuated in the event of a shutdown. The SCR dosing system must therefore be configured such that it is not damaged as a result of freezing of the reducing agent. Nevertheless, all of the components of the SCR dosing system, in particular the dosing valve, should at the same time be as inexpensive as possible.

SUMMARY OF THE INVENTION

It is an object of the present invention to solve or at least alleviate the technical problems highlighted in connection with the prior art. It is sought in particular to propose a particularly advantageous dosing valve capable of withstanding freezing.

The dosing valve according to one embodiment of the invention has at least a valve housing with a duct and with a valve body that is movable so as to open and close the dosing valve, and a spring which exerts a spring force on the valve body and thus holds the valve body in a rest position, wherein the spring is supported on at least one calibration body, the valve body, the spring and the at least one calibration body are arranged in the duct, and the at least one calibration body is supported by a support component which is fastened in the valve housing by a cohesive connection, wherein a section of the support component protrudes out of the valve housing.

The dosing valve preferably has at least one inlet through which liquid additive can pass into the dosing valve. Furthermore, the dosing valve preferably has at least one outlet through which liquid additive can be dispensed from the dosing valve in dosed fashion. There is preferably a flow path through the dosing valve from the inlet to the outlet, wherein the liquid additive can follow said flow path from the inlet to the outlet and said flow path can be closed by the valve body. During the operation of the dosing valve, said flow path is at least partially filled with the liquid additive. If the flow path from the inlet to the outlet is to be opened up, the valve body is moved in order to open the dosing valve. The valve body is held in a rest position by the spring by virtue of the spring exerting a spring force on the valve body. In the rest position, the valve body is preferably preloaded against a stop by the spring and the spring force. The spring is supported against at least one calibration body. During the assembly of the dosing valve, the position of the calibration body is individually fixed in order to precisely set the spring force exerted by the spring on the valve body.

The duct preferably forms, at least in sections, the flow path through the dosing valve (preferably from the at least one inlet to the at least one outlet). The valve housing is preferably designed as a casting into which the duct is cast. It is also possible for the duct to be drilled or milled into the valve housing. The valve housing is preferably composed of metal. The valve housing may also be composed of sheet-metal parts. A cohesive connection may for example be a brazed connection or a welded connection.

The materials of the calibration body and of the support component and the material of the dosing valve, or the material of the valve housing, in the region of the cohesive connection are preferably metallic. The welded connection is preferably a metallic welded connection in which a metallic material of the support component and a metallic material of the valve housing are melted together. The welded connection is preferably produced in the presence of a protective gas in order to keep oxygen away from the weld location during the welding process and ensure particularly high quality of the welded connection.

Freezing liquid additive in the dosing valve can exert very high forces on the dosing valve components that adjoin the liquid additive. In particular, water-based liquid additives (such as, for example, urea-water solution) expand as they freeze, whereby very high pressures can be generated. It has been found that, by a cohesive connection to a support component, the calibration sleeve can be fastened in the valve housing such that no permanent displacement or deformation of the calibration sleeve occurs as a result of ice pressure that arises. In this way, the spring force exerted on the valve body by the spring is also not permanently changed.

The dosing valve may comprise not only the valve body, the spring and the calibration body but also further components such as, for example, a drive unit, seals, etc. A drive unit of a dosing valve generally comprises an electric drive. The drive is typically capable of exerting a force on the valve body, which force acts counter to the spring force in order to open the dosing valve. If the force exerted on the valve body by the drive exceeds the spring force, the valve body moves and the dosing valve opens. The valve body then opens up the flow path from the at least one inlet to the at least one outlet of the dosing valve. The force exerted on the valve body by the drive is normally a magnetic force. The valve body therefore preferably has at least one section composed of metal in order that a magnetic force of the drive can act on the valve body.

A cohesive connection can be integrated into the manufacture of a dosing valve with relatively little technical outlay, in particular if the cohesive connection is formed in addition to a press-fit connection between the dosing valve and the calibration body. It has been found that it would be significantly more cumbersome to produce a more stable press-fit connection because, for this purpose, the entire dosing valve housing would have to be of significantly more stable design to be able to permanently withstand the high forces of the press-fit connection. It has proven to be particularly advantageous to use both a press-fit connection and also the described cohesive connection to a support component in order to fix the calibration body because, then, the forces for holding the calibration body (even under the action of ice pressure) are distributed across two different connections, and thus reliable positioning of the calibration body can be ensured even without a more stable design of the dosing valve.

The support component preferably bears directly against the calibration body. The support component lengthens the calibration body. The section of the support component is preferably designed such that the support component is supported on a valve holder for the dosing valve. The length by which the section protrudes beyond the valve housing is preferably selected correspondingly. It is accordingly possible for the force for holding the calibration body to be yet further increased. The valve holder is for example a receptacle for the dosing valve in a feed device for metering the liquid additive to an exhaust-gas treatment device. In particular, the lengthening of the support component makes it possible to realize a cohesive connection to the valve housing, and/or to reduce an upstream inflow volume (cavity), and/or to provide guidance/mounting for the support component outside the valve housing.

The dosing valve is furthermore advantageous if the calibration body is of a sleeve-shaped form, and the duct has a duct section in which the calibration body can be positioned to set the spring force exerted on the valve body by the spring. The support component is preferably likewise sleeve-shaped and positioned in the duct section.

The duct is preferably of cylindrical shape in sections and preferably has a circular cross-sectional area. The sleeve-shaped calibration body is preferably adapted to the cylindrical shape of the duct such that the calibration body bears against the wall of the duct such that liquid additive cannot flow through between the calibration body and the wall of the duct, and instead a flow path of the liquid additive extends through the sleeve-shaped calibration body. The calibration body preferably has an (end-side) support section on which the spring is supported. The spring force of the spring, which is exerted on the valve body, preferably acts, at the opposite end of the spring in relation to the valve body, on the calibration body. The spring is braced between the valve body and the calibration body. The duct section, which is preferably of cylindrical form in order that the calibration body can be positioned therein, is preferably designed to be slightly longer than the calibration body so that the position of the calibration body in the duct section can be varied within a range in order to compensate the manufacturing tolerances of the spring, as described further above.

The dosing valve is also advantageous if the valve body bears against a closing seat when in the rest position and the dosing valve is closed in the rest position, and to open the dosing valve, the valve body can be moved away from the closing seat counter to the spring force. The closing seat preferably forms that point of the dosing valve or of the valve housing against which the valve body bears in the rest position. The valve body and the closing seat together preferably interrupt the flow path through the dosing valve from the inlet to the outlet when the valve body bears against the closing seat. In the rest position, the dosing valve is preferably closed.

The dosing valve is also advantageous if the calibration body is connected to the dosing valve by a press-fit connection. The calibration body is (as already described further above) preferably positioned in a duct section of a duct in the dosing valve. The calibration body, which is preferably of sleeve-shaped form, is preferably deformable in a radial direction. It is accordingly possible for the calibration body to initially be positioned in the duct section and then expanded in the radial direction so as to be pressed against a wall of the duct. Such a deformation preferably does not change the positioning of the calibration body in the axial direction (along the duct), which would cause the spring force exerted on the spring by the calibration body to be influenced.

The dosing valve is furthermore advantageous if the dosing valve has an opening through which the fluid to be dosed can pass into the dosing valve, furthermore the calibration body and the support component extend from the spring as far as the opening, and the cohesive connection is formed on an outer surface of the support component and on the opening. The support component extends not only as far as the opening but also, by way of one section, beyond the opening.

The described opening preferably simultaneously constitutes the inlet for the liquid additive into the dosing valve. Furthermore, the opening preferably simultaneously constitutes an inlet into the duct through the dosing valve, in which duct there is arranged the duct section in which the calibration body can be located. By virtue of the fact that the calibration body and the support component extend from the spring to the opening, it is made possible for the cohesive connection to be provided directly at the opening. The position of the cohesive connection is thus easily accessible, and the cohesive connection can be produced with little outlay.

It is particularly preferable for the cohesive connection to be formed in an encircling fashion on the outer surface of the support component. The outer surface of the support component is, at that section of the support component which protrudes out of the valve housing, very easily accessible for welding equipment, for example. Furthermore, the outer surface is in direct contact with the valve housing. It is therefore advantageous to provide an (encircling) cohesive (welded) connection at that location.

Also proposed within the context of the invention is a motor vehicle, at least having an internal combustion engine, an exhaust-gas treatment device for the purification of the exhaust gases of the internal combustion engine, and a feed device for feeding an additive into the exhaust-gas treatment device, said feed device having a dosing valve according to the invention.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and in particular the illustrated proportions are merely schematic. In the figures.

DETAILED DESCRIPTION OF THE PRESENTLY PREFERRED EMBODIMENTS

Figure 1:
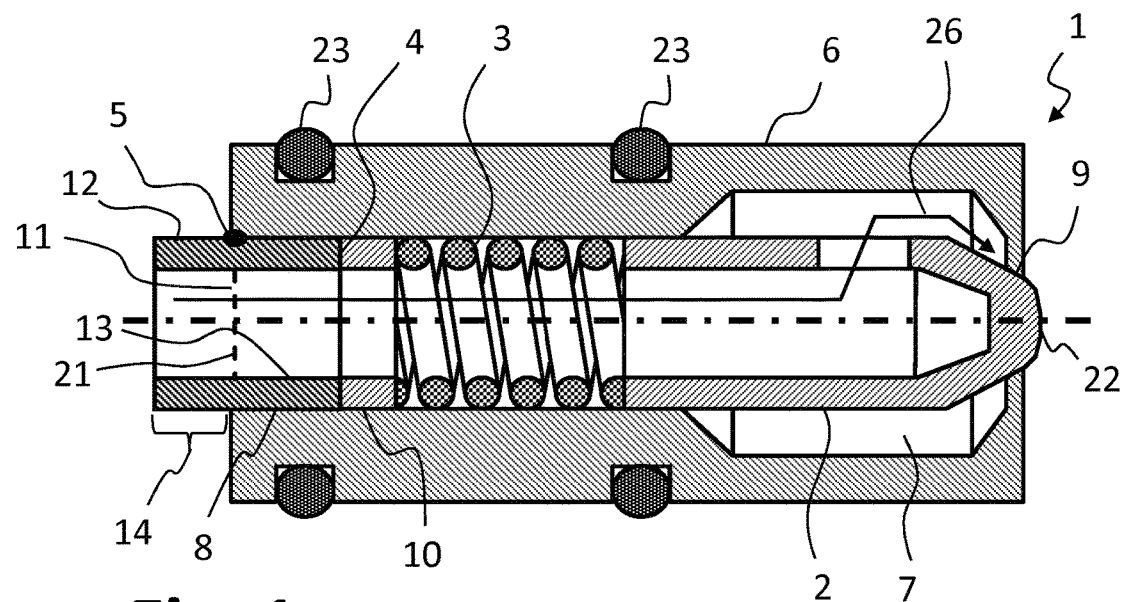
FIG. 1 is a design variant of a dosing valve in a closed state.

FIG. 1 shows a dosing valve 1 having a valve housing 6 through which a duct 7 extends. A valve body 2 is arranged in the duct 7. The valve body 2 is braced in the dosing valve 1 or in the valve housing 6 or in the duct 7 by a spring 3. For this purpose, the spring 3 is supported against a calibration body 4. The calibration body 4, the spring 3, and the valve body 2 are inserted into the valve housing 6 through an opening 11 of the duct 7. Here, the calibration body 4 is situated in a duct section 8 of the duct 7. The spring 3 exerts a defined force on the valve body 2, which force presses the valve body 2 against a closing seat 9 and thus closes the dosing valve 1. To move the valve body 2 away from the closing seat 9 and thus open a flow path 10 through the dosing valve 1 from an inlet 21 to an outlet 22, and thus open the dosing valve 1, the valve body 2 can be moved counter to the spring force exerted by the spring 3 by a drive (not illustrated). The dosing valve 1 or the valve housing 6 of the dosing valve 1 preferably has, on an outer surface, seals 23 by which the dosing valve 1 can be inserted in fluid-tight fashion into a feed device (not illustrated), by which liquid additive can be fed into an exhaust-gas treatment device. In a feed device of said type, the dosing valve 1 performs the task of adjusting the quantity of liquid additive fed by the feed device.

The calibration body 4 is supported on a support component 13. The support component 13 supports the calibration part 4. A cohesive connection 5 is formed on an outer surface 12 on the support component 13 in the region of a section 14 of the support component 13. The section 14 protrudes out of the valve housing 6. In this way, the cohesive connection 5 is arranged in the vicinity of the opening 11. A tool for forming the cohesive connection 5 need not extend very far into the duct 7, and instead can remain in the vicinity of the opening 11.

Figure 2:
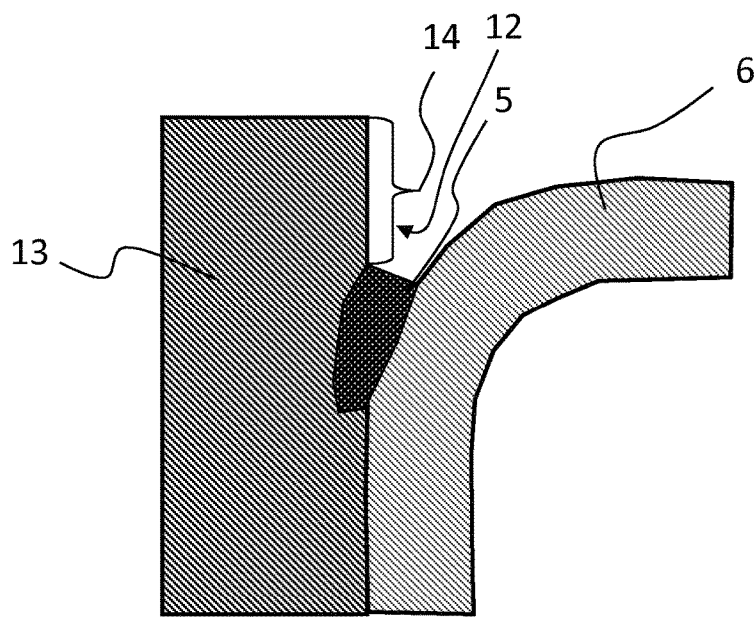
FIG. 2 is a detail of a dosing valve.

FIG. 2 shows a detail of a dosing valve. The figure shows a part of the support component 13 and a part of the valve housing 6. The support component 13 is of sleeve-shaped form, and in this case, only a section through the wall of the support component 13 is illustrated. The cohesive connection 5 is formed on the outer surface 12 of the support component 13 in a section 14 and which extends out of the valve housing 6. The cohesive connection 5 may be formed linearly in encircling fashion along the entire outer surface 12 of the support component 13.

Figure 3:
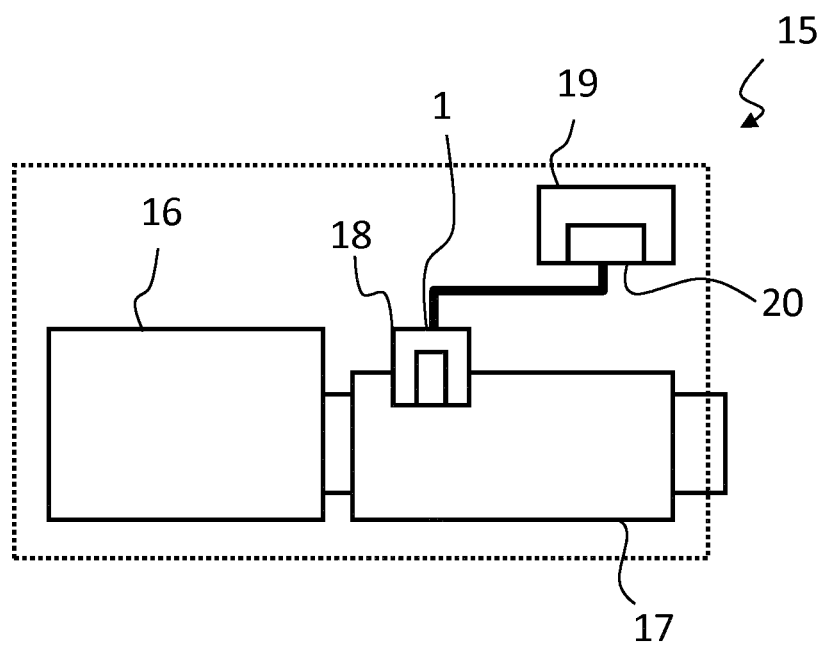
FIG. 3 is a motor vehicle having a dosing valve.

FIG. 3 shows a motor vehicle 15 having an internal combustion engine 16 and having an exhaust-gas treatment device 17 for the purification of the exhaust gases of the internal combustion engine 16. The motor vehicle 15 also has a tank 19 in which liquid additive (for example urea-water solution) is stored. The liquid additive from the tank 19 can be delivered to a feed device 18 by a delivery unit 20 (for example a pump). In the feed device 18 there is provided a dosing valve 1 by means of which liquid additive can be fed to the exhaust-gas treatment device 17.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A dosing valve, comprising:
a valve housing defines a duct;
a valve body movably arranged in the duct to open and close the dosing valve;
a spring arranged in the duct and configured to exert a spring force on the valve body to hold the valve body in a rest position;
at least one calibration body arranged in the duct and configured to support the spring and configured to set the spring force exerted by the spring on the valve body; and
a support component fastened in the valve housing by a cohesive connection so that a section of the support component protrudes out of the valve housing and configured to support the at least one calibration body,
wherein the at least one calibration body is connected to the dosing valve by a press-fit connection.

2. The dosing valve as claimed in claim 1,
wherein the at least one calibration body is sleeve-shaped, and
wherein the duct has a duct section in which the at least one calibration body is positioned to set the spring force exerted on the valve body by the spring.

3. The dosing valve as claimed in claim 1, wherein the cohesive connection is formed in an encircling fashion on an outer surface of the support component.

4. The dosing valve as claimed in claim 1, wherein the calibration body is separate from the support component.

5. The dosing valve as claimed in claim 1,
a valve housing defines a duct;
a valve body movably arranged in the duct to open and close the dosing valve;
a spring arranged in the duct and configured to exert a spring force on the valve body to hold the valve body in a rest position;
at least one calibration body arranged in the duct and configured to support the spring and configured to set the spring force exerted by the spring on the valve body; and
a support component fastened in the valve housing by a cohesive connection so that a section of the support component protrudes out of the valve housing and configured to support the at least one calibration body,
wherein the valve housing defines an opening through which a fluid to be dosed can pass into the duct,
wherein the at least one calibration body and the support component extend from the spring at least as far as the opening, and
wherein the cohesive connection is formed on an outer surface of the support component and at the opening.

6. The dosing valve as claimed in claim 5, wherein the cohesive connection is formed in an encircling fashion on the outer surface of the support component.

7. The dosing valve as claimed in claim 6, wherein the at least one calibration body is connected to the dosing valve by a press-fit connection.

\* \* \* \* \*